US012602699B2

(12) United States Patent
Rognoni et al.

(10) Patent No.: US 12,602,699 B2
(45) Date of Patent: Apr. 14, 2026

(54) METHOD FOR AUTHENTICATING AND ANTI-COUNTERFEITING COFFEE MACHINES OR COFFEE GRINDERS

(71) Applicant: Cimbali Group S.p.A., Binasco (IT)

(72) Inventors: Paolo Rognoni, Binasco (IT); Michele Campanella, Binasco (IT); Dario Costa, Binasco (IT)

(73) Assignee: Cimbali Group S.p.A., Binasco MI (IT)

( * ) Notice: Subject to any disclaimer, the term of this patent is extended or adjusted under 35 U.S.C. 154(b) by 0 days.

(21) Appl. No.: 18/770,990

(22) Filed: Jul. 12, 2024

(65) Prior Publication Data

US 2025/0021996 A1    Jan. 16, 2025

(30) Foreign Application Priority Data

Jul. 12, 2023    (IT) ........................ 102023000014640

(51) Int. Cl.
     *G06Q 30/018*       (2023.01)
     *A47J 31/52*        (2006.01)
            (Continued)

(52) U.S. Cl.
     CPC ........ *G06Q 30/0185* (2013.01); *A47J 31/521* (2018.08); *A47J 42/38* (2013.01); *H04L 9/3268* (2013.01)

(58) Field of Classification Search
None
See application file for complete search history.

(56) References Cited

U.S. PATENT DOCUMENTS

| | | | | |
|---|---|---|---|---|
| 10,560,448 B1 * | 2/2020 | Witten | ................ | H04L 63/0823 |
| 11,392,947 B1 * | 7/2022 | Prasad | ................ | G06Q 20/363 |

(Continued)

FOREIGN PATENT DOCUMENTS

| | | | | | |
|---|---|---|---|---|---|
| CN | 114584316 A | * | 6/2022 | ............. | G06F 21/31 |
| WO | WO-2021004825 A1 | * | 1/2021 | ........... | H04L 9/3213 |

OTHER PUBLICATIONS

M. A. A. da Cruz, J. J. P. C. Rodrigues, p. Lorenz, V. V. Korotaev and V. H. C. de Albuquerque, "In.IoT—A New Middleware for Internet of Things," in IEEE Internet of Things Journal, vol. 8, No. 10, pp. 7902-7911, May 15, 15, 2021, doi: 10.1109/JIOT.2020.3041699 (Year: 2021).*

(Continued)

*Primary Examiner* — Eduardo Castilho
(74) *Attorney, Agent, or Firm* — Rankin Hill & Clark, LLP; Erik J. Overberger

(57)           ABSTRACT

Method for authenticating and anti-counterfeiting coffee machines or coffee grinders, comprising the steps of: acquiring by means of a web server identification data associated with a coffee machine or a coffee grinder; generating encrypted data by executing a hash function of the identification data; generating a digital certificate associated with a public key and a private key; storing the encrypted data in a blockchain by means of unique association with the public key of the digital certificate using the private key of the digital certificate; storing the public key and the private key in the database installed in the coffee machine or in the coffee grinder; sending the control unit of the coffee machine or the coffee grinder, by means of an application residing in a mobile device, an authentication request containing a message with the public key; in response, sending by means of the control unit the digitally signed message with the private key stored in the database to the application; sending the signed message to the web server by means of the (Continued)

application; sending to the web server an authentication request notification by means of the communication between the control unit and the web server when the communication unit receives the authentication request; sending to the blockchain by means of the web server the signed message received by the application; identifying the absence of counterfeiting of the coffee machine or of the coffee grinder only if the blockchain identifies that the signed message associated with the coffee machine or with the coffee grinder is authentic when both the public key and the private key of the digital certificate match.

9 Claims, 2 Drawing Sheets

(51) Int. Cl.
    *A47J 42/38*        (2006.01)
    *H04L 9/32*         (2006.01)

(56)                  References Cited

U.S. PATENT DOCUMENTS

| | | | | |
|---|---|---|---|---|
| 2017/0359338 A1* | 12/2017 | Tschofenig | .............. | G06F 21/44 |
| 2018/0109395 A1* | 4/2018 | Berdy | ................. | H04L 63/0428 |
| 2018/0183587 A1* | 6/2018 | Won | ......................... | G06F 21/44 |
| 2019/0109877 A1* | 4/2019 | Samuel | ................... | H04W 4/70 |
| 2019/0394145 A1* | 12/2019 | Le Huerou | .......... | G07G 1/0009 |
| 2020/0213193 A1* | 7/2020 | Newell | ................... | H04W 4/70 |
| 2020/0364817 A1 | 11/2020 | Liu et al. | | |
| 2021/0099875 A1* | 4/2021 | Loupos | ................. | H04L 9/0643 |
| 2022/0224518 A1* | 7/2022 | Sarkar | ..................... | G06F 21/64 |
| 2022/0239495 A1* | 7/2022 | Norton | ................. | G06Q 30/018 |
| 2022/0270421 A1 | 8/2022 | Carter | | |
| 2023/0045071 A1* | 2/2023 | Kalaldeh | .............. | G06Q 30/018 |
| 2023/0145439 A1 | 5/2023 | Suk | | |
| 2024/0012944 A1* | 1/2024 | Harel | ..................... | G06Q 20/36 |
| 2024/0113895 A1* | 4/2024 | Wang | .................... | H04L 9/3247 |

OTHER PUBLICATIONS

E. Kfoury and D. Khoury, "Distributed Public Key Infrastructure and PSK Exchange Based on Blockchain Technology," 2018 IEEE iThings and GreenCom and IEEE CPSCom and IEEE Smart Data, Halifax, NS, Canada, 2018, pp. 1116-1120, doi: 10.1109/Cybermatics_2018.2018.00203 (Year: 2018).*

I.-C. Lin, J.-Y. Huang and J. Lin, "A Certificate Management Mechanism Using Distributed Ledger," 2023 18th Asia Joint Conference on Information Security (AsiaJCIS), Koganei, Japan, 2023, pp. 66-72, doi: 10.1109/AsiaJCIS60284.2023.00021 (Year: 2023).*

J. Höglund, S. Lindemer, M. Furuhed, and S. Raza, "PKI4IoT: Towards public key infrastructure for the Internet of Things," Computers & Security, vol. 89, p. 101658, 2020, retrieved from https://www.sciencedirect.com/science/article/pii/S0167404819302019 (Year: 2020).*

PE2E Machine translation of Foreign Reference CN114584316A1 (Year: 2022).*

Italian search report dated Feb. 15, 2024; Application No. 102023000014640; 13 pages.

Qin Wang et al: "Non-Fungible Token (NFT): Overview, Evaluation, Opportunities and Challenges", arxiv.org, Cornell University Library, 201 Olin Library Cornell University Ithaca, NY 14853, May 16, 2021 (May 16, 2021).

* cited by examiner

METHOD FOR AUTHENTICATING AND ANTI-COUNTERFEITING COFFEE MACHINES OR COFFEE GRINDERS

SCOPE OF APPLICATION

The present invention relates to a method for authenticating and anti-counterfeiting coffee machines or coffee grinders.

DESCRIPTION OF THE PRIOR ART

Counterfeiting is a significant problem both for companies, which see their profits reduced and their reputation damaged, and for consumers, who instead risk having their safety and health compromised.

Often, in fact, the counterfeit product is made, with respect to the original product and without the knowledge of the consumers themselves, with cheaper materials. Such materials may not meet either the minimum design requirements or the legal provisions concerning food health, especially if the counterfeit product is a coffee machine or a coffee grinder.

The need to protect products from counterfeiting is therefore felt, and specifically coffee machines or coffee grinders, so as to protect on the one hand the companies which invest part of their revenues in research and innovation every year, and on the other hand the safety of consumers.

Technological tools for combating counterfeiting are known, aimed at identifying the product. In the prior art, the anti-counterfeiting solutions are based on the use of optical codes, markings, radio frequencies of the RFID/NFC type, chemical substances and specialised databases. Some of these technologies allow to trace back to a simple self-declaration of product authenticity, for example by reading a QR code placed on the product labelling.

On the other hand, newer technologies based on the use of artificial intelligence (AI) allow to trace back to more complete documentation, interacting the information by drawing from several websites connected to each other. In fact, AI-type algorithms are very effective in combating counterfeiting and preventing users from having to use specific Apps. In particular, the use of blockchain technology is now widespread. The latter, initially used for cryptocurrencies, is now increasingly present in various fields such as, for example, in the insurance or automotive sectors.

Blockchain technology belongs to those technologies in which the register, the virtual place where all the information considered of interest is transcribed, is structured as a chain of blocks containing the transactions and whose validation is entrusted to a consent mechanism, distributed on all the nodes of the network. Such nodes participate in the process of validating the transactions to be included in the register.

The use of an anti-counterfeiting system related to a generic product using the combination of a Non-Fungible token (NFT) and a Near-Field Communication (NFC) tag is known. It is also known to use a transaction control system based on blockchain technology referring to a household appliance such as a coffee machine.

PROBLEM OF THE PRIOR ART

In the case of interaction with multiple websites linked to each other, one of the limits encountered is the fact that it is not known to which site or link the QR code is linked. A counterfeiter could therefore affix a QR code on a counterfeit product which certifies the originality thereof.

In addition, the systems which allow verification through Internet sites have several drawbacks. For example, the server could suffer a cyber attack and therefore the information contained therein could be modified in a malicious manner. It should be noted here that each known anti-counterfeiting solution requires an application thereof which consumers must equip themselves with in order to assess the authenticity of the product in question, for example by reading a QR code, a barcode or an RFID with NFC technology.

On the other hand, the use of blockchain technology according to the teachings of the prior art also has some drawbacks. In fact, it often happens that the devices, in order to function best, require updating some data stored in their control card. In the example case of coffee machines, the user may be required to update the beverage preparation recipes. The data related to the update could be located on a blockchain. In this case, following the teachings of the prior art, such an update could also be applied to a counterfeit product. Furthermore, a counterfeit accessory could be connected to an original product.

SUMMARY OF THE INVENTION

The object of the present invention is to make a method for authenticating and anti-counterfeiting coffee machines or coffee grinders capable of overcoming the drawbacks of the prior art.

An object of the invention is to guarantee to users that the product in their possession or on which they are operating is an original product.

A further object of the invention is to allow the product to be updated or the data to be transferred from a blockchain only if such operations are carried out on a non-counterfeit, i.e., original, product.

The technical task mentioned and the objects stated are substantially achieved by a method comprising the technical features set out in one or more of the appended claims.

Advantages of the Invention

Thanks to an embodiment, it is possible to obtain a method which allows to certify the authenticity of a coffee machine or a coffee grinder.

Thanks to an embodiment, it is possible to create a method which allows to perform operations and updates of a coffee machine or a coffee grinder, also updating the identification data of the product only if it has been certified as original.

Thanks to an embodiment, it is possible to create a system for carrying out the anti-counterfeiting method of the invention.

BRIEF DESCRIPTION OF THE DRAWINGS

The features and advantages of the present invention will become apparent from the following detailed description of a possible practical embodiment thereof, illustrated by way of non-limiting example in the accompanying drawings, in which.

DETAILED DESCRIPTION

Figure 1:
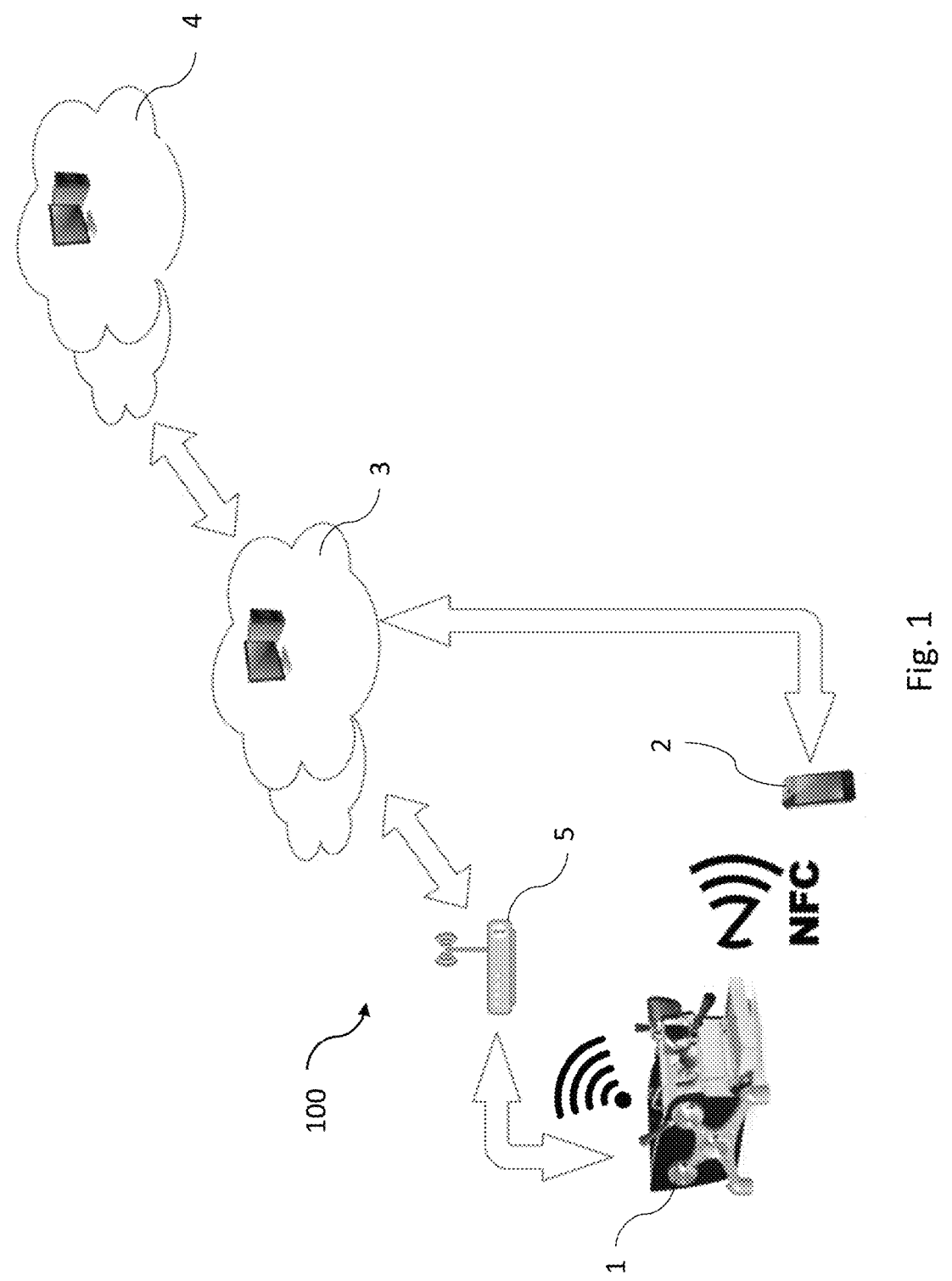
FIG. 1 shows a schematic representation of a system for carrying out the method of the invention.
Figure 2:
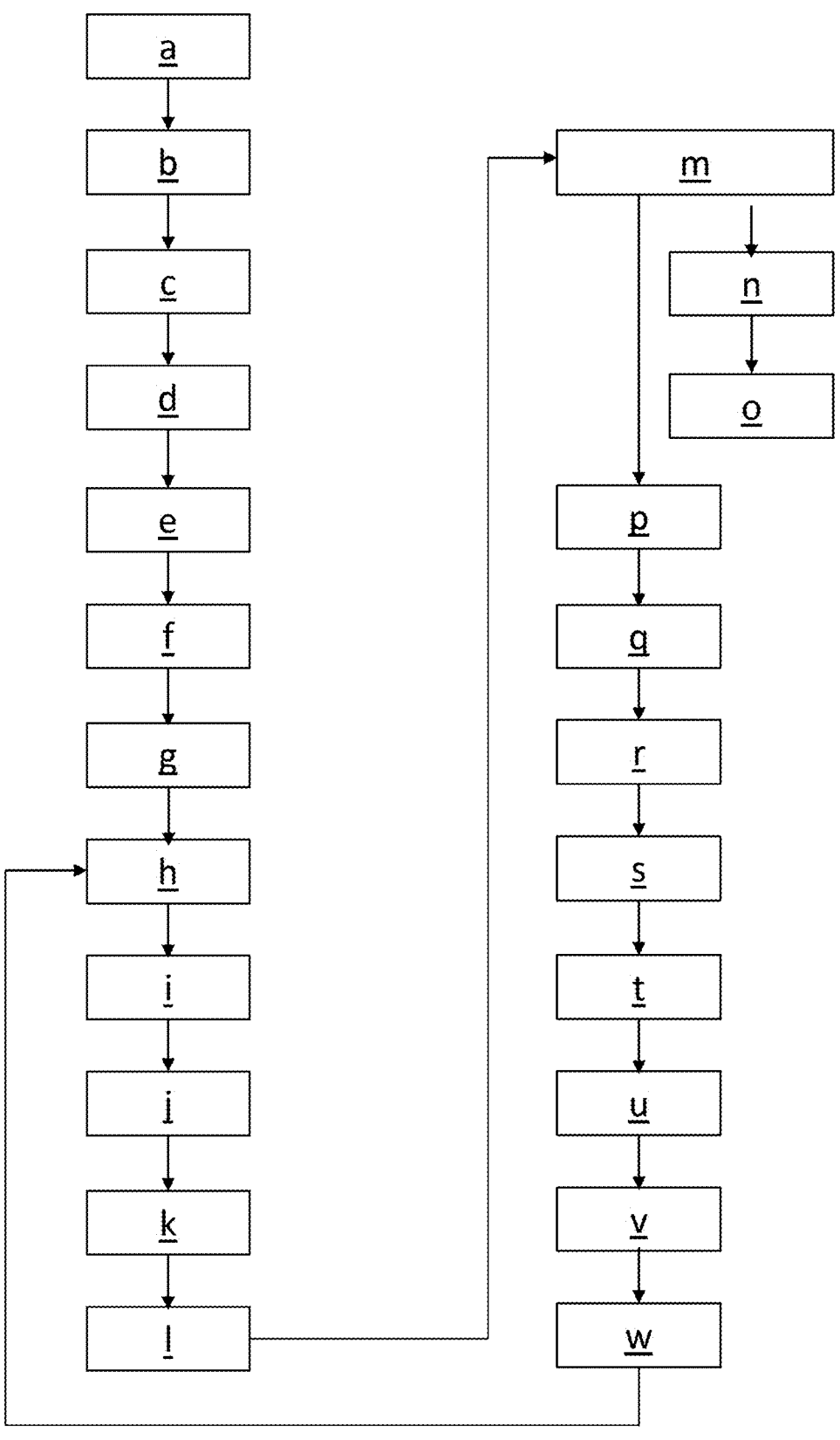
FIG. 2 shows a block diagram of the steps of the method according to the present invention.

The present invention relates to a method for authenticating and anti-counterfeiting coffee machines 1 or coffee grinders, such as coffee grinder-dosers. It should be noted that the method of the invention could also be applied to other types of products.

The method comprises the step a) of providing an application residing in a mobile device 2 connected to the internet and a web server 3 associated with the application. Preferably, the web server 3 is backend in the cloud. Preferably, the mobile device 2 is configured to support both Internet connection and short-range communication, such as NFC or Bluetooth. In particular, the mobile device 2 is configured to communicate bi-directionally with the web server 3. It should be noted that the web server 3 in the cloud is configured to communicate bi-directionally with the coffee machine 1 or with the coffee grinder and with a blockchain 4 in the cloud, through communication over the Internet. Preferably, the blockchain 4 is a public blockchain of known type. Still preferably, this step involves downloading and installing the application on the external mobile device 2, such as smartphone, tablet or PC. The mobile device 2 is provided with a radio interface, for example of the NFC type, while the application (called APP) is configured to interface directly with the coffee machine 1 or with the coffee grinder. It should be noted that the interface of the APP with the coffee machine 1 or with the coffee grinder is bidirectional.

The method also provides the step b) of installing a control unit in a coffee machine 1 or in a coffee grinder, which is associated with a database and a radio frequency communication unit for communication with the mobile device 2, for example by means of NFC technology. Furthermore, the radio frequency communication unit allows communication with the web server 3, for example by means of a Wi-Fi router 5. This step is preferably carried out in the factory by the manufacturer of the coffee machine 1 or the coffee grinder.

The method comprises the step c) of acquiring identification data by means of the web server 3, which are associated with the coffee machine 1 or the coffee grinder. In other words, the coffee machine 1 or the coffee grinder is digitized, generating an identification data file preferably comprising information or a document related to the product, such as the serial number, the owner's data, the ordinary and extraordinary maintenance booklet, the ownership changes, the data related to the recipes and the update firmware.

The method also comprises the step d) of generating encrypted data by means of the web server 3 by executing a hash function of the identification data. The encrypted data is also defined in the reference sector as digest. As is known, it is not possible to carry out an inverse function on the digest to trace back to the original file, i.e., in the present case it is not possible to carry out an inverse function on the encrypted data to obtain the identification data. It should be noted that, in this step, the digitized file related to the identification data undergoes the hashing operation by means of which an alpha-numeric sequence (hash) is obtained which the web server 3 uniquely associates with the digitized file, i.e., with the identification data.

The method further includes the step e) of generating a digital certificate, and in particular NFT (Non Fungible Token), associated with a public key and a private key. It should be noted that this step is preferably carried out in the factory, by means of a specific manufacturing application configured to interface with both the coffee machine or the coffee grinder and with a blockchain 4 for the generation of a digital certificate and which allows, by means of a short-range connection (NFC or Bluetooth) to transfer said digital certificate (e.g., NFT) to the coffee machine 1 or to the coffee grinder. Optionally, the digital certificate is a temporary certificate, which has a predetermined duration beyond which it expires. Obviously, the manufacturing application is installed on a device used in the factory, configured to communicate with both the coffee machine 1 or with the coffee grinder and with the blockchain 4 and the web server 3.

The method comprises the further step f) of storing, by means of the web server 3, the encrypted data in the blockchain 4 by means of unique association with the public key of the digital certificate, preferably of the NFT, using the private key of the digital certificate, preferably of the NFT. Preferably, the blockchain 4 is a cloud service. In other words, the hash (i.e., the encrypted data) is stored within a blockchain 4, i.e., in a Distributed Ledger Technology (DLT). Such an operation first requires the creation of a digital certificate, and in particular NFT (Non Fungible Token), which is obtained using known platforms. It is worth recalling here that the generation of a digital certificate, and in particular an NFT, determines the creation of two keys: a public key and a private key. It should be noted that the web server 3, acting as an intermediary with the manufacturing application, sends the encrypted data to the blockchain 4 which stores them according to the prior art using the public and private key of the digital certificate.

The method comprises the step g) of storing the public key and the private key in the database (or memory unit/control card) installed in the coffee machine 1 or in the coffee grinder. In other words, the coffee machine 1 or the coffee grinder comprises a control card (CPU), and in detail a database or memory unit, in which both the public key and the private key obtained during the generation of the digital certificate, and in particular the NFT, are stored. The private key is generated and transferred to the database of the coffee machine 1 or the coffee grinder and there is no way to extract it. As mentioned above, the method envisages that a short-range communication device, for example NFC, consisting of an antenna, NFC integrated circuit suitable for two-way wireless communication with the control card (CPU) and towards external mobile devices 2, such as smartphones, tablets and PCs, is also added to the coffee machine 1 or the coffee grinder. It should be noted that the steps described above are preferably carried out in the factory, in particular when the product is new or in any case when the method is carried out for the first time, even using a collector's item or in any case already on the market. Still preferably, the step g) is carried out in the factory using a specific manufacturing application, used by the manufacturer.

The method further comprises the step h) of sending, by means of the application, the control unit an authentication request containing a message with the public key by putting the mobile device 2 in communication with the communication unit. It should be noted that, once the APP is installed on the mobile device 2, access to the APP occurs after registration/authentication of the user, as per the prior art. Once the user is registered/authenticated, he can select, directly from the mobile device 2, the authenticity verification request of the coffee machine 1 or the coffee grinder. Preferably, to do this, the user must first type in the product data (coffee machine 1 or coffee grinder). For example, such data comprises the model and/or serial number. Subsequently, the user must bring the mobile device 2 closer to the coffee machine 1 or the coffee grinder. Thereby, the short-range data exchange with NFC mode between the coffee machine/grinder and the mobile device 2 is activated.

The method further includes the step i) of generating a signed message by means of digital signature of the message with the public key received from the application using the private key stored in the database. This step also includes sending the signed message to the application in response to the authentication request by means of communication between the mobile device 2 and the communication unit.

The method comprises the step j) of receiving and sending the signed message to the web server 3 by means of the application. In particular, in the previous step, the control card of the coffee machine/grinder transmits the signed message to the mobile device 2. Subsequently, the mobile device 2, by means of the APP, sends the digitally signed message on the platform of the web server 3 in the cloud.

The method includes the further step k) of sending an authentication request notification to the web server 3 via the control unit by means of communication between the control unit and the web server 3 when the communication unit receives the authentication request. That is, when the communication between the coffee machine/grinder and the mobile device 2 with receipt of the authentication request is activated, the same machine/grinder control card transmits an authentication request notification directly to the platform of the web server 3 in the cloud via the internet. It should be noted that step k) can also be carried out before step i) or simultaneously, and in any case both upon receipt of the authentication request by the control unit. Preferably, the communication unit of the coffee machine 1 or the coffee grinder can communicate with the web server 3 by connecting to the internet, by means of a Wi-Fi router 5 or by using a SIM card.

The method comprises the step l) of sending the blockchain 4, by means of the web server 3, the signed message received by the application if the web server 3 identifies that the signed message and the authentication request notification both come from the coffee machine 1 or the coffee grinder. It should be recalled that the web server 3 is capable of verifying that the public key is uniquely associated with the coffee machine 1 or the coffee grinder, since the web server 3 itself stored such an association in the moment when the digital certificate was generated, and in particular the NFT.

The method further includes the step m) of identifying the absence of counterfeiting of the coffee machine 1 or the coffee grinder if and only if:

the blockchain 4 identifies that the signed message associated with the coffee machine 1 or coffee grinder is authentic when both the public key and the private key of the digital certificate match.

The result of the verification, whether positive or negative, is retransmitted to the platform of the web server 3 in the cloud which in turn transfers the information to the APP and the coffee machine 1 or coffee grinder. Preferably, the coffee machine 1 or coffee grinder is provided with a user interface which allows product-related information to be displayed, such as, in this case, a confirmation of the originality of the machine.

Preferably, the method further includes the step n) of identifying the presence of counterfeiting of the coffee machine 1 or the coffee grinder when the aforesaid conditions do not occur, i.e.:

if the blockchain 4 identifies that in the signed message associated with the coffee machine 1 or coffee grinder there is no match with the public key and the private key of the digital certificate, and/or even if the web server 3 identifies that the signed message and the authentication request notification do not both come from the coffee machine 1 or the coffee grinder.

Preferably, the method comprises the further step o) of receiving, by means of the web server 3, an alarm message from the blockchain 4 when the presence of counterfeiting of the coffee machine 1 or the coffee grinder is identified. Preferably, this step also includes sending a notification to the application to display a message on the mobile device 2, in which the message displayed indicates the counterfeiting of the coffee machine 1 or the coffee grinder.

According to a preferred embodiment of the invention, the step c) of acquiring identification data by means of the web server 3 which are associated with the coffee machine 1 or the coffee grinder involves storing the identification data associated with the coffee machine 1 or the coffee grinder in the web server 3.

Preferably, the step d) of generating encrypted data by means of the web server 3 by executing a hash function of the identification data also involves storing the association between the encrypted data and identification data related to the coffee machine 1 or the coffee grinder in the web server 3.

Still preferably, the method comprises the further step p) of receiving, by means of the web server 3, the encrypted data sent by the blockchain 4 when the absence of counterfeiting of the coffee machine 1 or the coffee grinder is identified.

Still preferably, the method includes step q) of sending the identification data associated with the data encrypted by the web server 3 to the application. Preferably, if the verification of the blockchain 4 is successful, then the blockchain 4, by means of the application (or APP), can send the identification data. For example, the blockchain 4 could carry out one or more of the following steps: transmitting the certificate of authenticity of the product (machine/grinder), the document certifying its current and previous ownership, the maintenance document, and/or transferring updated firmware and recipes to the APP.

Advantageously, the association between the encrypted data, i.e., the hash of the identification data, and the identification data itself is stored in the web server 3. Next, following the successful outcome of the check carried out in the blockchain 4, i.e., when the web server 3 receives the encrypted data back from the blockchain 4, the associated identification data can be traced. The web server 3 then sends such identification data to the application, to display them on the mobile device 2 and then possibly modify them.

Preferably, the method comprises the step r) of displaying the identification data on the mobile device 2 by means of the application. Preferably, the method also includes the sub-step r2) of displaying on the mobile device 2 the telemetry data of the coffee machine 1 or the coffee grinder by means of the application. It should be noted that the telemetry data, i.e., the usage data of the coffee machine 1 or the coffee grinder, is obtained from the machine itself and preferably indicates the status in case of malfunction, such as temperature and milk shortage alarms. By means of the APP, using the NFC, it is also possible to transfer telemetry data from the coffee machine 1 or the coffee grinder to the APP for on-site consultation on the mobile device 2, i.e., without passing through the web server 3, which nevertheless records this data in its own database.

According to a preferred solution of the invention, the method comprises the further step s) of entering further identification data associated with the coffee machine 1 or the coffee grinder by means of the application of the mobile device 2.

Preferably, the method also includes the step t) of acquiring, by means of the web server 3, the further identification data associated with the coffee machine 1 or the coffee grinder.

Still preferably, the method comprises the step u) of generating, by means of the web server 3, further encrypted data by executing a hash function of the further identification data.

Still preferably, the method includes the step v) of storing, by means of the web server 3, the further data encrypted in the blockchain 4 by means of a unique association with the public key of the digital certificate, i.e., the NFT, using the private key of the NFT.

According to a preferred solution, the method includes the further step w) of repeating steps h) to o) for the identification data and further identification data. Preferably, the step w) also involves repeating steps p) to r) for the identification data and for the further identification data. Advantageously, in the case of non-counterfeit coffee machine 1 or coffee grinder, and therefore original, it is possible for the user to update the product identification data in a secure and certified manner. For example, the identification data could be updated to account for updates, repairs, and changes of ownership. Therefore, after updating, it will be possible to repeat the aforesaid steps of the method to verify the absence of counterfeiting, displaying the updated identification data from time to time.

According to a preferred embodiment of the method, the step f) of storing, by means of the web server 3, the encrypted data in a blockchain 4 by means of unique association with the public key of the digital certificate, i.e., of the NFT using the private key of the NFT, involves encrypting the encrypted data by means of the blockchain 4 using the private key to store them in the blockchain 4.

Advantageously, the disclosed method allows to avoid possible hacking of the coffee machine 1 or the coffee grinder. Even if a hypothetical counterfeiter could copy the NFC but was not aware of the public key inserted in the control card of the machine, he would not be able to access any sensitive data of the machine itself. In fact, the platform of the web server 3, before transmitting the data to the blockchain 4, awaits the signed message transmitted via the internet by the APP but also the authentication request notification sent by the machine itself which, being counterfeit, could not be capable of communicating via the internet with the platform of the web server 3. Consequently, the request would be aborted. Even if the public key was known to the counterfeiter, the platform of the web server 3 would be capable of recognizing the counterfeit machine as unregistered at the time of its construction or its upgrade according to the method of the invention.

According to a preferred solution, the method involves temporarily transferring to the mobile device 2, by means of the APP, a copy of the machine's digital certificate (token), so as to allow the owner of the machine to enjoy temporary benefits, such as participation in events reserved for original and digitally certified machine owners. The temporary certificate has a temporary validity and will expire automatically after the end of the benefit or after a predetermined time.

An anti-counterfeiting system 100 of coffee machines 1 or coffee grinders for carrying out the method described so far is schematically illustrated in FIG. 1. In this regard, the elements of the system 100, as well as its functionalities, have already been introduced in the previous part of the description.

In short, the system 100 comprises at least one coffee machine 1 and/or at least one coffee grinder. The system 100 further comprises a web server 3 and an application associated therewith and residing on a mobile device 2 of the user. The web server 3 is placed in signal communication with a blockchain 4, preferably provided by a cloud service. The communication occurs by means of the internet also between web server 3 and the application residing in the mobile device 2. The coffee machine 1 or the coffee grinder are provided with a communication unit adapted to communicate via the internet with the web server 3 by means of a Wi-Fi router 5 or SIM card, or to communicate in proximity via NFC or Bluetooth with the application residing on the mobile device 2. It should be noted that the system 100 can comprise a plurality of coffee machines 1 and/or coffee grinders, as the method can be applied to each individual product using the same web server 3 and the application, clearly also using different mobile devices 2 belonging to various users.

Advantageously, in the specific case of coffee machines 1 or coffee grinders, blockchain technology is particularly useful to avoid the counterfeiting of some new products, as well as collections for historical or design interest. For example, in the latter case it is possible to digitize the identification data, for example some documents related to the design, the serial number of the product, the owners to whom it belonged, the maintenance programs carried out and the spare parts used. The digitization of documents and their transcription in the distributed blockchain ledger therefore allow to certify and authenticate every event that has affected the product.

The invention claimed is:

1. A method for authenticating and anti-counterfeiting coffee machines or coffee grinders, comprising the steps of:
    a) providing an application residing in a mobile device connected to internet and a web server associated with the application;
    b) installing a control unit in a coffee machine or in a coffee grinder, which is associated with a database, said database being installed in the coffee machine or in the coffee grinder, and a radio frequency communication unit for communication with the mobile device and with the web server;
    c) acquiring identification data by means of the web server, which are associated with the coffee machine or the coffee grinder;
    d) generating encrypted data by means of the web server by executing a hash function of the identification data;
    e) generating a digital certificate implemented as a non-fungible token (NFT) that is uniquely associated with a public key and a private key;
    f) storing the encrypted data in a blockchain by means of unique association with the public key of the digital certificate using the private key of the digital certificate;
    g) storing the public key and the private key in the database installed in the coffee machine or in the coffee grinder;
    h) by means of the application, sending the control unit an authentication request containing a message with the public key by putting the mobile device in communication with the communication unit;
    i) in response to the authentication request, generating a signed message by means of digital signature of the message with the public key received from the application using the private key stored in the database and sending to the application, by means of the control unit, the signed message by means of the communication between the mobile device and the communication unit;

j) receiving the signed message and sending the signed message to the web server by means of the application;

k) sending an authentication request notification to the web server via the control unit by means of communication between the control unit and the web server when the communication unit receives the authentication request;

l) by means of the web server, sending the blockchain the signed message received by the application after the web server identifies that the signed message and the authentication request notification both come from the coffee machine or the coffee grinder; and m) identifying the absence of counterfeiting of the coffee machine or coffee grinder based on the blockchain identifying only when the blockchain identifies that the signed message associated with the coffee machine or coffee grinder is authentic when both the public key and the private key of the digital certificate match.

2. The method according to claim 1, wherein:

step c) of acquiring identification data by means of the web server which are associated with the coffee machine or the coffee grinder involves storing the identification data associated with the coffee machine or the coffee grinder in the web server;

step d) of generating encrypted data by means of the web server by executing a hash function of the identification data also involves storing the association between the encrypted data and identification data related to the coffee machine or the coffee grinder in the web server;

comprising the further steps of:

p) by means of the web server, receiving the encrypted data sent by the blockchain when the absence of counterfeiting of the coffee machine or the coffee grinder is identified;

q) sending the identification data associated with the data encrypted by the web server to the application.

3. The method according to claim 2, comprising the further step of:

r) displaying the identification data on the mobile device by means of the application.

4. The method according to claim 3, comprising the further steps of:

s) entering further identification data associated with the coffee machine or the coffee grinder by means of the application of the mobile device;

t) by means of the web server, acquiring the further identification data associated with the coffee machine or the coffee grinder;

u) by means of the web server, generating further encrypted data by executing a hash function of the further identification data;

v) storing the further encrypted data in the blockchain by uniquely associating it with the public key of the digital certificate using the private key of the digital certificate.

5. The method according to claim 4, comprising the further step of:

w) repeating steps h) to m) for the identification data and further identification data.

6. The method according to claim 5, wherein step w) also involves repeating steps p) to r) for the identification data and for the further identification data.

7. The method according to claim 1, wherein:

step f) of storing the encrypted data in a blockchain by means of unique association with the public key of the digital certificate using the private key of the digital certificate involves encrypting the encrypted data by means of the blockchain using the private key to store them in the blockchain.

8. The method according to claim 1, wherein step e) of generating a digital certificate associated with a public key and a private key is executed using a manufacturing application in signal communication with the coffee machine or with the coffee grinder, with the blockchain and with the web server.

9. The method according to claim 8, wherein also step g) of storing the public key and the private key in the database installed in the coffee machine or the coffee grinder, is executed using the manufacturing application.

* * * * *